US010394391B2

(12) United States Patent
Reynolds et al.

(10) Patent No.: US 10,394,391 B2
(45) Date of Patent: Aug. 27, 2019

(54) SYSTEM AND METHOD FOR REDUCING DISPLAY ARTIFACTS

(71) Applicant: SYNAPTICS INCORPORATED, San Jose, CA (US)

(72) Inventors: Joseph Kurth Reynolds, Alviso, CA (US); Stephen L. Morein, San Jose, CA (US); Prashant Shamarao, Cupertino, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 67 days.

(21) Appl. No.: 14/788,660

(22) Filed: Jun. 30, 2015

(65) Prior Publication Data

US 2016/0195957 A1 Jul. 7, 2016

Related U.S. Application Data

(60) Provisional application No. 62/100,047, filed on Jan. 5, 2015.

(51) Int. Cl.
G06F 3/044 (2006.01)
G06F 3/041 (2006.01)

(52) U.S. Cl.
CPC ............ G06F 3/044 (2013.01); G06F 3/0412 (2013.01); G06F 3/0416 (2013.01)

(58) Field of Classification Search
CPC ....... G06F 3/044; G06F 3/0416; G06F 3/0412
See application file for complete search history.

(56) References Cited

U.S. PATENT DOCUMENTS 4,866,986 A 9/1989 Cichanski
5,093,655 A 3/1992 Tanioka et al.
(Continued)

FOREIGN PATENT DOCUMENTS

CN 1940842 A 4/2007
CN 101051256 A 10/2007
(Continued)

OTHER PUBLICATIONS

International Search Report and Written Opinion dated May 29, 2014 for Application No. PCT/US2014/016577.
(Continued)

Primary Examiner — Nitin Patel
Assistant Examiner — Robert M Stone
(74) Attorney, Agent, or Firm — Patterson + Sheridan, LLP

(57) ABSTRACT

In an example, a processing system for an integrated display device and capacitive sensing device includes driver circuitry and a driver module. The driver circuitry is configured for coupling to a plurality of source lines and a plurality of sensor electrodes, where each of the plurality of sensor electrodes comprises at least one common electrode configured for display updating and capacitive sensing. The driver module is coupled to the driver circuitry and configured to drive the plurality of sensor electrodes for capacitive sensing during a first non-display update period that occurs between first and second display line update periods of a display frame, where the non-display update period is at least as long as one of the first and second display line update periods. The driver module is further configured to operate each of the plurality of source lines to reduce display artifacts during the non-display update period.

21 Claims, 8 Drawing Sheets

(56) References Cited

U.S. PATENT DOCUMENTS

| | | | |
|---|---|---|---|
| 5,392,058 A | 2/1995 | Tagawa | |
| 5,394,003 A | 2/1995 | Bales et al. | |
| 5,534,892 A | 7/1996 | Tagawa | |
| 5,896,120 A | 4/1999 | Iguchi et al. | |
| 6,078,315 A | 6/2000 | Huang | |
| 6,219,113 B1 | 4/2001 | Takahara | |
| 6,239,788 B1 | 5/2001 | Nohno et al. | |
| 6,537,216 B1 | 3/2003 | Shifrin | |
| 6,560,276 B1 | 5/2003 | Long et al. | |
| 6,593,917 B2 | 7/2003 | Toda | |
| 6,621,341 B1 | 9/2003 | Shifrin | |
| 6,741,237 B1 | 5/2004 | Benard et al. | |
| 7,031,886 B1 | 4/2006 | Hargreaves | |
| 7,187,369 B1 | 3/2007 | Kanbara et al. | |
| 7,207,222 B2 | 4/2007 | Thompson et al. | |
| 7,265,746 B2 | 9/2007 | Knowles et al. | |
| 7,417,441 B2 | 8/2008 | Reynolds | |
| 7,451,050 B2 | 11/2008 | Hargreaves | |
| 7,583,092 B2 | 9/2009 | Reynolds et al. | |
| 7,633,566 B2 | 12/2009 | Utsunomiya et al. | |
| 7,892,175 B2 | 2/2011 | Wakabayashi et al. | |
| 9,245,490 B1* | 1/2016 | Cho | G09G 3/3655 |
| 2004/0095336 A1 | 5/2004 | Hong et al. | |
| 2004/0217945 A1 | 11/2004 | Miyamoto et al. | |
| 2005/0135492 A1 | 6/2005 | Jia et al. | |
| 2005/0264222 A1* | 12/2005 | Lee | G09G 3/22 315/160 |
| 2006/0012575 A1 | 1/2006 | Knapp et al. | |
| 2006/0114247 A1 | 6/2006 | Brown | |
| 2006/0214918 A1 | 9/2006 | Destura et al. | |
| 2006/0236029 A1 | 10/2006 | Corrado et al. | |
| 2007/0026966 A1 | 2/2007 | Sanchez | |
| 2007/0074914 A1 | 4/2007 | Geaghan et al. | |
| 2007/0262966 A1 | 11/2007 | Nishimura et al. | |
| 2008/0018581 A1 | 1/2008 | Park et al. | |
| 2008/0048989 A1 | 2/2008 | Yoon et al. | |
| 2008/0055267 A1 | 3/2008 | Wu et al. | |
| 2008/0061140 A1 | 3/2008 | McMahon | |
| 2008/0062139 A1 | 3/2008 | Hotelling et al. | |
| 2008/0062140 A1 | 3/2008 | Hotelling et al. | |
| 2008/0062147 A1 | 3/2008 | Hotelling et al. | |
| 2008/0062148 A1 | 3/2008 | Hotelling et al. | |
| 2008/0074182 A1 | 3/2008 | Hoelzle et al. | |
| 2008/0144743 A1 | 6/2008 | Alderson et al. | |
| 2008/0150901 A1 | 6/2008 | Lowles et al. | |
| 2008/0170017 A1* | 7/2008 | Jeoung | G09G 3/3648 345/87 |
| 2008/0180407 A1 | 7/2008 | Utsunomiya et al. | |
| 2008/0198140 A1* | 8/2008 | Kinoshita | G06F 3/042 345/173 |
| 2008/0238867 A1 | 10/2008 | Maeda et al. | |
| 2008/0309625 A1 | 12/2008 | Krah et al. | |
| 2008/0309627 A1 | 12/2008 | Hotelling et al. | |
| 2008/0309628 A1 | 12/2008 | Krah et al. | |
| 2009/0009194 A1 | 1/2009 | Seguine | |
| 2009/0079707 A1 | 3/2009 | Kaehler et al. | |
| 2009/0160461 A1 | 6/2009 | Zangl et al. | |
| 2009/0189867 A1 | 7/2009 | Krah et al. | |
| 2009/0195511 A1 | 8/2009 | Cites et al. | |
| 2009/0213042 A1 | 8/2009 | Hagino et al. | |
| 2009/0256818 A1 | 10/2009 | Noguchi et al. | |
| 2010/0001973 A1 | 1/2010 | Hotelling et al. | |
| 2010/0019780 A1 | 1/2010 | Bulea | |
| 2010/0045635 A1 | 2/2010 | Soo | |
| 2010/0053145 A1* | 3/2010 | Morita | G09G 3/3688 345/213 |
| 2010/0053380 A1 | 3/2010 | Ise | |
| 2010/0060591 A1 | 3/2010 | Yousefpor et al. | |
| 2010/0066692 A1 | 3/2010 | Noguchi et al. | |
| 2010/0085324 A1 | 4/2010 | Noguchi et al. | |
| 2010/0110040 A1 | 5/2010 | Kim et al. | |
| 2010/0182273 A1 | 7/2010 | Noguchi et al. | |
| 2010/0193257 A1 | 8/2010 | Hotelling et al. | |
| 2010/0194695 A1 | 8/2010 | Hotelling et al. | |
| 2010/0194696 A1 | 8/2010 | Chang et al. | |
| 2010/0194697 A1 | 8/2010 | Hotelling et al. | |
| 2010/0194698 A1 | 8/2010 | Hotelling et al. | |
| 2010/0214262 A1 | 8/2010 | Ishizaki et al. | |
| 2010/0225612 A1 | 9/2010 | Ishizaki et al. | |
| 2010/0265210 A1 | 10/2010 | Nakanishi et al. | |
| 2010/0289765 A1 | 11/2010 | Noguchi et al. | |
| 2010/0295804 A1 | 11/2010 | Takeuchi et al. | |
| 2010/0295824 A1 | 11/2010 | Noguchi et al. | |
| 2010/0302202 A1 | 12/2010 | Takeuchi et al. | |
| 2010/0309162 A1 | 12/2010 | Nakanishi et al. | |
| 2010/0321034 A1 | 12/2010 | Hargreaves | |
| 2010/0328239 A1 | 12/2010 | Harada et al. | |
| 2010/0328255 A1 | 12/2010 | Ishizaki et al. | |
| 2010/0328256 A1 | 12/2010 | Harada et al. | |
| 2010/0328257 A1 | 12/2010 | Noguchi et al. | |
| 2010/0328259 A1 | 12/2010 | Ishizaki et al. | |
| 2010/0328274 A1 | 12/2010 | Noguchi et al. | |
| 2010/0328291 A1 | 12/2010 | Ishizaki et al. | |
| 2011/0042152 A1 | 2/2011 | Wu | |
| 2011/0050585 A1 | 3/2011 | Hotelling et al. | |
| 2011/0102361 A1 | 5/2011 | Philipp | |
| 2011/0210939 A1* | 9/2011 | Reynolds | G06F 3/0418 345/174 |
| 2011/0210940 A1 | 9/2011 | Reynolds | |
| 2011/0210941 A1 | 9/2011 | Reynolds et al. | |
| 2011/0227889 A1 | 9/2011 | Choi | |
| 2011/0234560 A1* | 9/2011 | Shin | G09G 3/003 345/208 |
| 2011/0267305 A1 | 11/2011 | Shahparnia et al. | |
| 2011/0284949 A1 | 11/2011 | Meng et al. | |
| 2011/0285244 A1 | 11/2011 | Lewis et al. | |
| 2011/0285683 A1 | 11/2011 | Todorovich et al. | |
| 2011/0298746 A1 | 12/2011 | Hotelling | |
| 2012/0032911 A1 | 2/2012 | Jung et al. | |
| 2012/0182251 A1 | 7/2012 | Krah | |
| 2012/0212521 A1 | 8/2012 | Yamauchi et al. | |
| 2012/0218246 A1 | 8/2012 | Ueda et al. | |
| 2012/0229419 A1* | 9/2012 | Schwartz | G06F 3/0418 345/174 |
| 2012/0242597 A1 | 9/2012 | Hwang et al. | |
| 2012/0249476 A1 | 10/2012 | Schwartz et al. | |
| 2013/0021309 A1 | 1/2013 | Kothari et al. | |
| 2013/0050144 A1 | 2/2013 | Reynolds | |
| 2013/0057511 A1 | 3/2013 | Shepelev et al. | |
| 2013/0113735 A1* | 5/2013 | Takeuchi | G06F 3/0412 345/173 |
| 2013/0127752 A1* | 5/2013 | Takeuchi | G02F 1/13338 345/173 |
| 2013/0176251 A1* | 7/2013 | Wyatt | G09G 5/18 345/173 |
| 2013/0194224 A1* | 8/2013 | Lai | G06F 3/0412 345/174 |
| 2013/0215075 A1 | 8/2013 | Lee et al. | |
| 2013/0321296 A1 | 12/2013 | Lee et al. | |
| 2013/0342481 A1 | 12/2013 | Small et al. | |
| 2014/0049507 A1* | 2/2014 | Shepelev | G06F 3/0412 345/174 |
| 2014/0062943 A1* | 3/2014 | Choi | G06F 3/0412 345/174 |
| 2014/0267217 A1 | 9/2014 | Lillie et al. | |
| 2014/0267349 A1* | 9/2014 | Lee | G06F 3/044 345/589 |
| 2014/0285462 A1* | 9/2014 | Lee | G09G 3/3648 345/173 |
| 2015/0009171 A1* | 1/2015 | Shepelev | G06F 3/044 345/174 |
| 2015/0177880 A1* | 6/2015 | Shin | G06F 3/0412 345/174 |
| 2015/0378512 A1* | 12/2015 | Choi | G06F 3/0418 345/174 |
| 2016/0019827 A1* | 1/2016 | Lee | G09G 3/3208 345/204 |

(56) References Cited

U.S. PATENT DOCUMENTS

2016/0364046 A1* 12/2016 Yoshii .................... G06F 3/044

FOREIGN PATENT DOCUMENTS

| | | |
|---|---|---|
| CN | 1940842 B | 5/2010 |
| EP | 1892605 A2 | 2/2008 |
| EP | 1936479 A1 | 6/2008 |
| EP | 1892605 A3 | 7/2008 |
| EP | 2330493 A2 | 6/2011 |
| JP | 2006106853 A | 4/2006 |
| JP | 2007334606 A | 12/2007 |
| JP | 2008090623 A | 4/2008 |
| JP | 2010072581 A | 4/2010 |
| TW | 200945147 A | 11/2009 |
| WO | WO-0127868 A1 | 4/2001 |
| WO | WO-03019346 A1 | 3/2003 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

OTHER PUBLICATIONS

Phillippe Lambinet, FOGALE nanotech, presentation materials dared, May 22, 2013, France.
International Search Report and Written Opinion for Application No. PCT/US2014/039235, dated Sep. 19, 2014, 10 pages.

* cited by examiner

SYSTEM AND METHOD FOR REDUCING DISPLAY ARTIFACTS

CROSS-REFERENCE TO RELATED APPLICATIONS

This application claims benefit of U.S. provisional patent application Ser. No. 62/100,047, filed Jan. 5, 2015, which is incorporated by reference herein.

BACKGROUND

Field of the Disclosure

Embodiments of disclosure generally relate to capacitive sensing and display updating in parallel and, more particularly, to a system and method for reducing display artifacts while capacitive sensing and display updating.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for reducing display artifacts while capacitive sensing and display updating are described. In an embodiment, a processing system for an integrated display device and capacitive sensing device comprises driver circuitry and a driver module. The driver circuitry is configured for coupling to a plurality of source lines and a plurality of sensor electrodes, where each of the plurality of sensor electrodes comprises at least one common electrode configured for display updating and capacitive sensing. The driver module is coupled to the driver circuitry and configured to drive the plurality of sensor electrodes for capacitive sensing during a first non-display update period that occurs between first and second display line update periods of a display frame, where the non-display update period is at least as long as one of the first and second display line update periods. The driver module is further configured to operate each of the plurality of source lines to reduce display artifacts during the non-display update period.

In another embodiment, an integrated display device and capacitive sensing device comprises a plurality of source lines, a plurality of sensor electrodes, and a processing system. Each of the plurality of sensor electrodes comprises at least one common electrode configured for display updating and capacitive sensing. The processing system is coupled to the plurality of source lines and the plurality of sensor electrodes. The processing system is configured to drive the plurality of sensor electrodes for capacitive sensing during a first non-display update period that occurs between first and second display line update periods of a display frame, where the non-display update period is at least as long as one of the first and second display line update periods. The processing system is further configured to operate each of the plurality of source lines to reduce display artifacts during the non-display update period.

In another embodiment, a method of operating an integrated display device and capacitive sensing device having a plurality of source lines and a plurality of sensor electrodes is disclosed. The plurality of sensor electrodes are disposed in a matrix array on a common electrode layer for display updating and capacitive sensing. The method includes driving the plurality of sensor electrodes for absolute capacitive sensing during a first non-display update period that occurs between first and second display line update periods of a display frame, where the non-display update period at least as long as one of the first and second display line update periods. The method further includes operating each of the plurality of source lines to reduce display artifacts during the non-display update period.

In another embodiment, an integrated display device and capacitive sensing device includes a plurality of source lines, a matrix array of sensor electrodes disposed on a common electrode layer for display updating and capacitive sensing, and a processing system, coupled to the plurality of source lines and the sensor electrodes. The processing system is configured to drive the sensor electrodes for capacitive sensing during a first non-display update period that occurs between first and second display line update periods of a display frame, where the non-display update period is at least as long as one of the first and second display line update periods. The processing system is further configured to operate each of the plurality of source lines to reduce display artifacts during the non-display update period.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
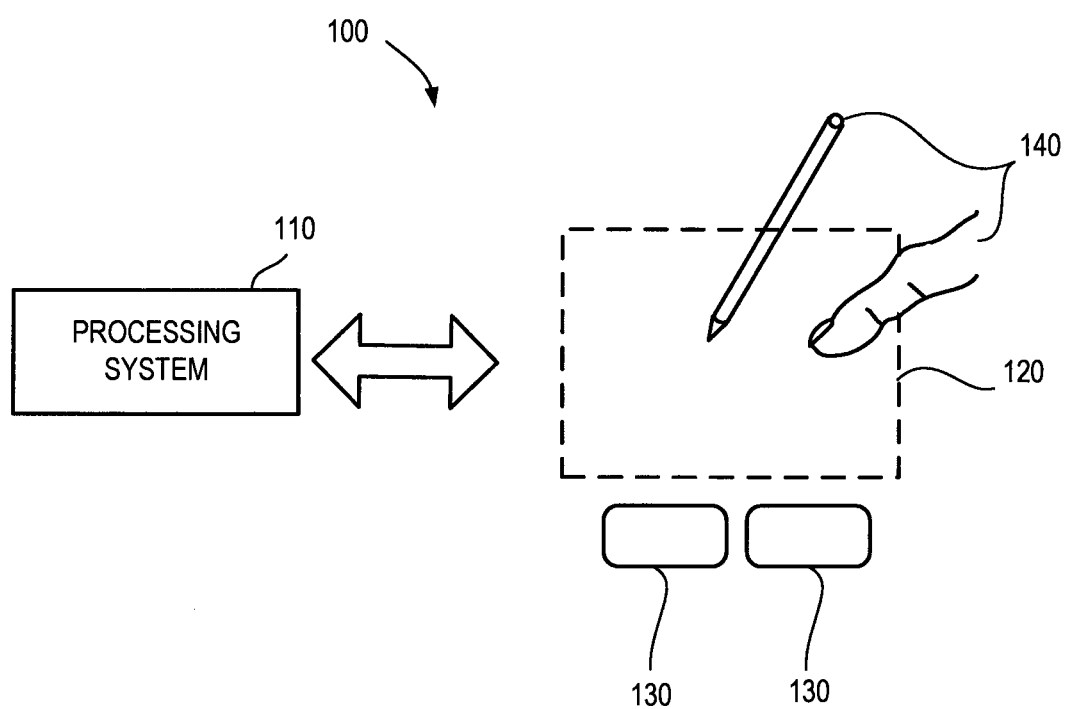
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
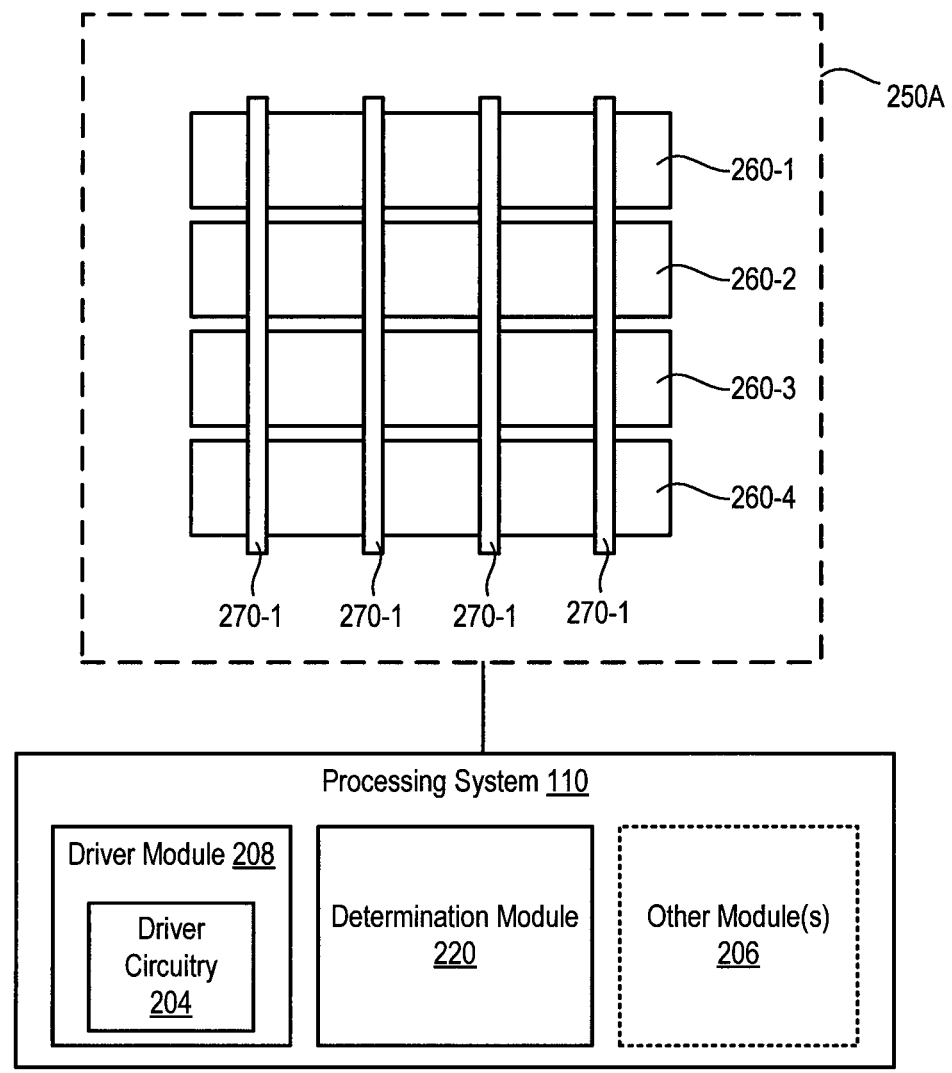
FIGS. 2A-2B illustrate portions of exemplary patterns of sensing elements according to embodiments described herein.

FIG. 2A illustrates a portion of an exemplary pattern of sensing elements according to some embodiments. For clarity of illustration and description, FIG. 2A shows the sensing elements in a pattern of simple rectangles and does not show various components, such as various interconnects between the sensing elements and the processing system 110. An sensor electrode pattern 250A comprises a first plurality of sensor electrodes 260 (260-1, 260-2, 260-3, . . . 260-$n$), and a second plurality of sensor electrodes 270 (270-1, 270-2, 270-3, . . . 270-$m$) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "second plurality of sensor electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The sensor electrode pattern 250A can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image."

In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a driver module 208 having driver circuitry 204. In various embodiments, the driver module 208 may be configured to drive sensor electrodes for capacitive sensing and to receive resulting signals with the sensor electrodes. Driver circuitry 204 may further comprise circuitry configured for driving the sensor electrodes for capacitive sensing and/or circuitry for receiving resulting signals with the sensor electrodes. The driver module 208 operates the sensor electrode pattern 250A by coupling voltage, current, or charge to electrodes in the sensor electrode pattern 250A. In examples described herein, the driver module 208 is configured to drive voltage, but it is to be understood that the driver module 208 can drive alternatively drive current or charge. The driver module 208 can couple constant, substantially constant, or time-varying voltage to electrodes in the sensor electrode pattern 250A. The driver circuitry 204 can include one or more drivers coupled to the sensor electrode pattern 250A. For example, the driver circuitry 204 can include transmitter(s) for coupling modulated signals to the first plurality of sensor electrodes 260. Further, driver circuitry 204 may comprises one or more receivers configured to operate the sensor electrode pattern 250A by measuring voltage, current, or charge from electrodes in the sensor electrode pattern 250A. For example, the receiver(s) can receiving resulting signals from the second plurality of sensor electrodes 270. The processing system 110 can include other module(s) 206, such as processing module(s) for determining capacitive couplings, object position information, and the like in response to measurements from the driver module 208. While only a single modules, 208 is shown, in general, the functions driving electrodes, receiving from electrodes, and processing measurements can be performed by other modules in the processing system 110.

The processing system 110 can operate in absolute capacitive sensing mode or transcapacitive sensing mode. In absolute capacitive sensing mode, receiver(s) in the driver circuitry 204 measure voltage, current, or charge on sensor electrode(s) in the electrode pattern 250A while the sensor electrode(s) are modulated with absolute capacitive sensing signals to generate the resulting signals. The determination module 220 generates absolute capacitive measurements from the resulting signals. The determination module 220 can track changes in absolute capacitive measurements to detect input object(s) in the sensing region 120.

In transcapacitive sensing mode, driver(s) or transmitter(s) in the driver circuitry 204 drive one or more of the first plurality of electrodes 260 with the capacitive sensing signal (also referred to as a transmitter signal or modulated signal in the transcapacitive sensing mode). Receiver(s) in the driver circuitry 204 measure voltage, current, or charge on one or more of the second plurality of electrodes 270 to generate the resulting signals. The resulting signals comprise the effects of the capacitive sensing signal and input object(s) in the sensing region 120. The determination module 220 generates transcapacitive measurements from the resulting signals. The determination module 220 can track changes in transcapacitive measurements to detect input object(s) in the sensing region 120.

In some embodiments, the processing system 110 "scans" the electrode pattern 250A to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In some touch screen embodiments, the driver module 208 controls voltage coupled to the common electrodes that are part of the first plurality of sensor electrodes 260. Thus, the driver module 208 can selectively couple a common voltage (e.g., Vcom) or a modulated signal to the first plurality of sensor electrodes 260. In some embodiments, the driver module 208 is further configured to drive source electrodes (also referred to as "source lines") of a display device. That is, the driver module 208 can comprise all or a portion of a display driver module configured to update a display. The driver circuitry 204 can include source drivers coupled to source lines of the display device. The driver module 208 can operate the sensor electrode pattern 250A and the source lines to perform both capacitive sensing and display updating.

In an embodiment, the processing system 110 comprises a single integrated controller, such as an application specific integrated circuit (ASIC), having the driver module 208, and any other module(s). In another embodiment, the processing system 110 can include a plurality of integrated circuits, where the driver module 208, at least one other module are divided among the integrated circuits. For example, the display module 208 can be on one integrated circuit, and another module(s) can be on one or more other integrated circuits. In some embodiments, a first portion of the driver module 208 can be on one integrated circuit and a second portion of the driver module 208 can be on second integrated circuit. In such embodiments, at least one of the first and second integrated circuits comprises at least portions of other modules such.

Figure 2B:
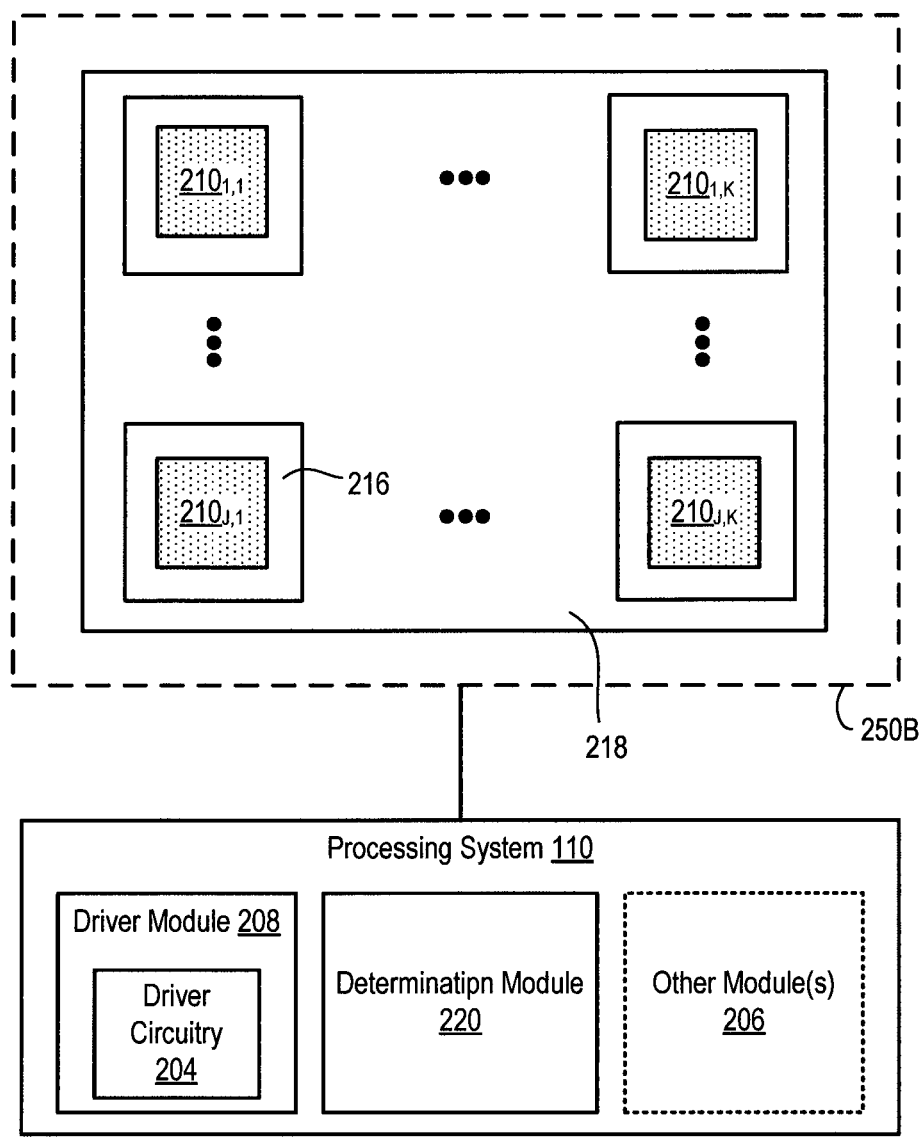

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 110 and the sensing elements. An electrode pattern 250B comprises a plurality of sensor electrodes 210 disposed in a rectangular matrix. The electrode pattern 250B comprises sensor electrodes $210_{J,K}$ (referred to collectively as sensor electrodes 210) arranged in J rows and K columns, where J and K are positive integers, although one or J and K may be zero. It is contemplated that the electrode pattern 250B may comprise other patterns of the sensor electrodes 210, such as polar arrays, repeating patterns, non-repeating patterns, non-uniform arrays a single row or column, or other suitable arrangement. Further, the sensor electrodes 210 may be any shape, such as circular, rectangular, diamond, star, square, noncovex, convex, non-concave concave, etc. Further, the sensor electrodes 210 may be sub-divided into a plurality of distinct sub-electrodes. The electrode pattern 250 is coupled to the processing system 110.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 110 can use at least one sensor electrode 210 to detect the presence of an input object via absolute capacitive sensing. The sensor module 208 can measure voltage, charge, or current on sensor electrode(s) 210 to obtain resulting signals indicative of a capacitance between the sensor electrode(s) 210 and an input object. The determination module 220 uses the resulting signals to determine absolute capacitive measurements. When the electrode pattern 250B, the absolute capacitive measurements can be used to form capacitive images.

In a second mode of operation, the processing system 110 can use groups of the sensor electrodes 210 to detect presence of an input object via transcapacitive sensing. The sensor module 208 can drive at least one of the sensor electrodes 210 with a transmitter signal, and can receive a resulting signal from at least one other of the sensor electrodes 210. The determination module 220 uses the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

Figure 3:
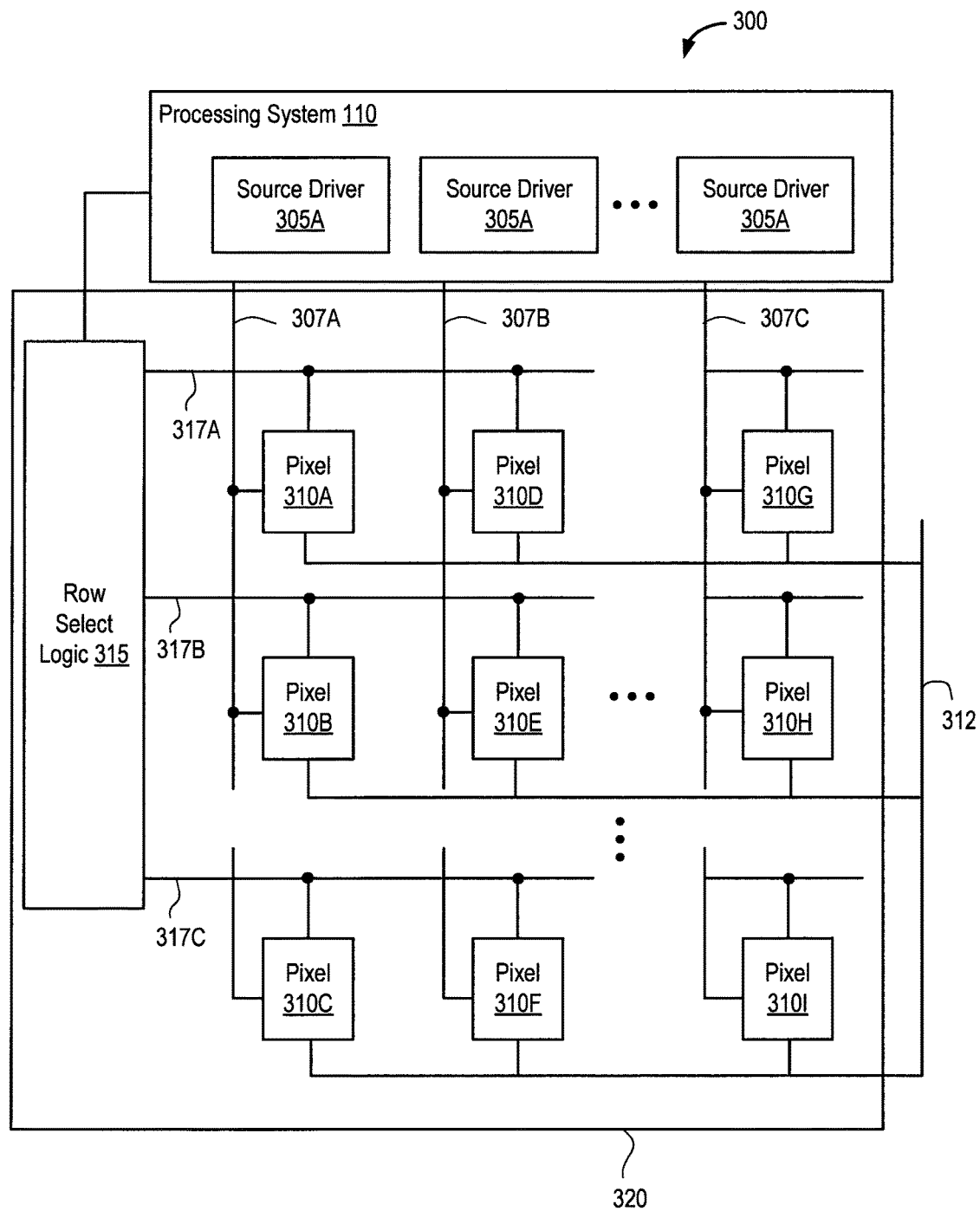
FIG. 3 is a schematic block diagram of a display device according to one embodiment described herein.

FIG. 3 is a schematic block diagram of a display device 300 according to embodiments described herein. Specifically, the display device 300 of FIG. 3 may be integrated with the input device 100. In an embodiment, the display device 300 includes a display screen 320 coupled to the processing system 110. Processing system 110 includes one or more source drivers 305 (e.g., source drivers 305A, 305B, 305C, etc.) that are each associated with one or more source lines 307 (source lines 307A, 307B, 307C, etc.) (also referred to as column lines) in the display screen 320. Source drivers 305 may be integrated in, or otherwise separate from driver module 305. In one or more embodiments, a timing controller (Tcon) is integrated with, or otherwise communicates with, the driver module 208 described above. Other circuitry and modules of the processing system 110 are omitted for clarity. In one or more embodiments, the timing controller and each source driver is disposed within separate integrated controllers. In such embodiments, functions of the driver module 208 and other modules may be divided amongst the various integrated controllers. For example, the source drivers 305 may comprise transmitters and/or receivers configured to operate the sensor electrodes for capacitive sensing and the timing controller is configured to process the resulting signals received by the receivers within the source drivers 305. In other embodiments, the timing controller comprises the transmitter(s) and the source drivers 305 comprise the receivers. In some embodiments, the source drivers 305 perform first processing on the resulting signals and the timing controller is performs second processing on the resulting signals. In such embodiments, the source drivers 305 may subtract baseline values from the resulting signals and the timing controller may determine positional information for one or more input objects based on the baselined resulting signals. While multiple integrated controllers are discussed above, in other embodiments, the timing controller and source driver(s) may be comprised within a single integrated controller.

In one embodiment, the processing system 110 and the display screen 320 are separate components. For example, the processing system 110 may be an ASIC that is communicatively coupled to the display screen 320 via one or more transmission lines of an interconnect component (e.g., a flexible circuit board). In another embodiment, the processing system 110 may be mounted on a substrate of the display screen 320 to form a single component.

The display device 300 can include row select logic 315 coupled to gate lines 317 (also referred to as row lines or display rows) in the display screen 320. In an embodiment, the row select logic 315 can be part of the display screen 320 (e.g., integrated into the display screen 320), the combination sometimes referred to as a "gate-in-panel (GIP)" display. Alternatively, the row select logic 315 can be part of another module (e.g., another integrated circuit) communicatively coupled to the display screen 320. In yet another embodiment, the row select logic 315 can be part of the processing system 110. The processing system 110 can be coupled to the row select logic 315 to control row selection during display update periods, as described below.

The display screen 320 comprises an array of pixels 310 (e.g., pixels 310A, 310B, 310C, etc. are shown). The pixels 310 (in contrast to the capacitive pixels discussed above) may be used to display an image on the display screen 320. The pixels 310 may use light emitting diode (LED), organic LED (OLED), cathode ray tube (CRT), liquid crystal display (LCD), plasma, electroluminescence (EL), or other display technology to display the image. Each of the pixels 310 can include one or more of such display elements (e.g., three such display elements for red, green, and blue colors). Each of the pixels 310 can include a transistor (not shown). Gates of the transistors in the pixels 310 can be coupled to respective gate lines 317, and sources of the transistors in the pixels 310 can be coupled to respective source lines 307. Drains of the transistors in the pixels 310 can be coupled to a common electrode 312 (e.g., Vcom). In an embodiment, the common electrode 312 can be segmented having one or more segments. In an embodiment, the segment(s) of the common electrode 312 comprise combination electrodes configured for both capacitive sensing and display updating. In further embodiments, the gate lines 317, source lines 307 or a combination of gate lines 317 and 307 may be used for both capacitive sensing and display updating.

The display driver module 306 can communicate control signals to the source drivers 305 and row select logic 315, the control signals being based on display data from a host processor (not shown). The source drivers 305 may receive an input voltage signal, which is amplified and transmitted on the source lines 307 to provide a source voltage to each of the pixels 310. To update a particular pixel 310, the row select logic 315 activates one of the gate lines 317. In one embodiment, each pixel 310 may contain a switching element (e.g., transistor) that permits the voltage of the source line 307 to change the color emitted by the pixel 310. For example, to update the pixel 310D, the row select logic 315 activates the gate line 317A to control the transistor such that the voltage generated by the source driver 305B changes the voltage associated with the pixel 310D. By coordinating the row select logic 315 with the voltages transmitted by the source drivers 305, the processing system 110 and display screen 320 may set the pixels 310 to respective voltages and display image frames.

In one or more embodiments, capacitive sensing and display updating may occur during at least partially overlapping periods. For example, as a combination electrode is driven for display updating, the combination electrode may also be driven for capacitive sensing. In another embodiment, capacitive sensing and display updating may occur during non-overlapping periods of display updating and capacitive sensing. Display updating is performed during "display line update periods" (also referred to as "display update periods"), and capacitive sensing is performed during "non-display update periods." In various embodiments, the non-display update periods may occur between display line update periods for two display lines of a display frame and may be at least as long in time as the display update period. The non-display update period may be referred to as a long horizontal blanking period, long H-blanking period, or a distributed blanking period. In other embodiments, the non-display update period may comprise both horizontal blanking periods and vertical blanking periods. Processing system 110 may be configured to drive sensor electrodes for capacitive sensing during any one or more of, or any combination of, the different non-display update periods. Non-display update periods may be used for sensing other than touch sensing (e.g., interference measurements, active modulated inputs).

Inserting long H-blanking periods between display update periods can cause visible display artifacts, such as pixel dimming. As described herein, the processing system 110 can implement various techniques to reduce display artifacts. In an embodiment, the processing system 110 can drive sensor electrodes for capacitive sensing during non-display update periods, while concurrently operating the source lines of the display device to reduce display artifacts during the non-display update periods.

FIGS. 4-12 illustrate signal patterns for capacitive sensing and display updating according to embodiments. The signal patterns include patterns of a gate clock signal 402 and a source driver signal 404 during display update periods 406-1 through 406-6 and a long H-blank period 408. In the example, the gate clock signal 402 includes a repeating pattern of three display update periods for sequentially activating a respective three display rows, a long H-blank period, and three more display update periods for sequentially activating a respective three display rows. Other signal patterns are possible. In general, the gate clock signal 402 includes a repeating pattern of at least one display update period 406, a long H-blank period 408, and at least one display update period 406, where the gate clock signal 402 activates a display row in each display update period 406 and does not activate any row during any long H-blank period 408. The processing system 110 can control the gate clock signal 402 to implement any particular signal pattern. The source driver signal 404 drives a source line for the Xth column of pixels. The processing system 110 can control a source driver 305 to generate the source driver signal 404. For clarity, only a single source driver signal 404 is shown, but the processing system 110 can control the other source drivers 305 to generate source driver signals to have the same signal pattern as the source driver signal 404.

Figure 4:
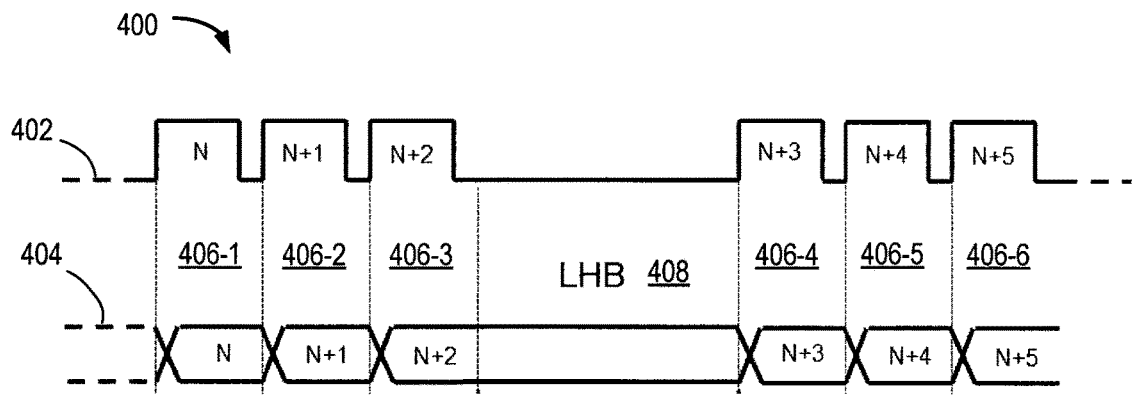
FIGS. 4-12 illustrate signal patterns for capacitive sensing and display updating according to embodiments.

FIG. 4 shows a signal pattern 400. In the example, the three display update periods 406-1, 406-2, and 406-3 correspond to display rows (gate lines) N, N+1, and N+2. In each of the display update periods 406-1 through 406-3, the processing system 110 switches the source driver signal 404 to a desired source voltage for the Xth pixel on each of the respective N, N+1, and N+2 display rows. During a long H-blank period 408, the processing system 110 controls the source driver signal 404 to hold the source voltage of the last display update period, e.g., the source voltage during the update period 406-3 for the Xth pixel in the display row N+2 ("hold last source"). Alternatively, the processing system 110 controls the source driver signal 404 to switch the source voltage to a selected voltage at some time during the long H-blank period 408. In an embodiment, the selected voltage is Vcom. In another embodiment, the selected voltage is half of the "on" voltage for the pixels (referred to herein as Vaa/2, where Vaa is a voltage supply that turns a pixel "on"). In another embodiment, rather than controlling the source driver signal 404 to hold any specific voltage, the processing system 110 allows the source driver signal 604 to electrically float during at least a portion of the long H-blank period 408.

After the long H-blank period 408, three display update periods 406-4, 406-5, and 406-6 correspond to display rows (gate lines) N+3, N+4, and N+5. In each of the display update periods 406-4 through 406-6, the source driver signal 404 is switched to a desired source voltage for the Xth pixel on each of the respective N+3, N+4, and N+5 display rows. The signal pattern 400 can be repeated for the gate clock signal 402 and the source driver signal 404.

In another embodiment, the processing system 110 controls the source driver signal 404 to switch the source voltage to a selected voltage at some time during the long H-blank period 408 in the signal pattern 400 ("hold selected"). In an embodiment, the selected voltage is Vcom. In another embodiment, the selected voltage is Vaa/2. In another embodiment, rather than controlling the source driver signal 404 to hold any specific voltage, the processing system 110 allows the source driver signal 404 to electrically float during at least a portion of the long H-blank period 408 ("high impedance"). In these embodiments, in the display update period 406-4, the processing system 110 controls the source driver signal 404 to switch to the desired source voltage for the Xth pixel of the display row N+3.

Figure 5:
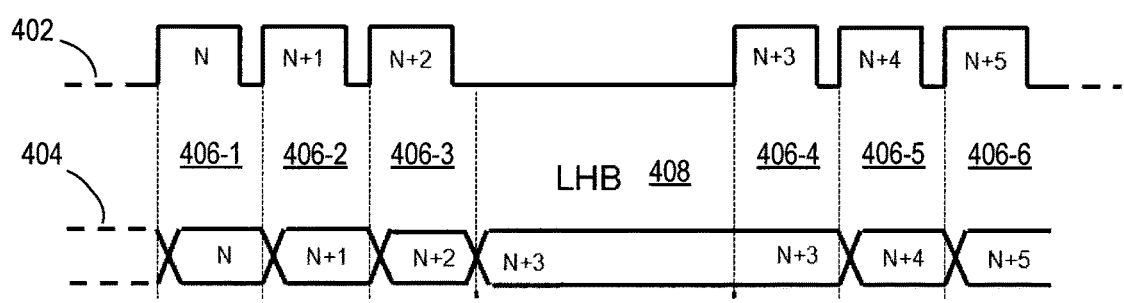

FIG. 5 shows a signal pattern 500. In the example, the three display update periods 406-1, 406-2, and 406-3 correspond to display rows (gate lines) N, N+1, and N+2. In each of the display update periods 406-1 through 406-3, the source driver signal 404 is switched to a desired source voltage for the Xth pixel on each of the respective N, N+1, and N+2 display rows. During the long H-blank period 408, the processing system 110 controls the source driver signal 404 to switch to the source voltage of the next display update period, e.g., the source voltage during the display update period 406-4 for the Xth pixel in the display row N+3 ("hold next source"). The processing system 110 can switch the source driver signal 404 to the source voltage for the display update period 406-4 at any time during the long H-blank period 408.

After the long H-blank period 408, the three display update periods 406-4, 406-5, and 406-6 correspond to display rows (gate lines) N+3, N+4, and N+5. In the display update period 406-4, the source driver signal 404 already has the desired source voltage for the Xth pixel of the display row N+3. In each of the display update periods 406-5 through 406-6, the source driver signal 404 is switched to a desired source voltage for the Xth pixel on each of the respective N+4 and N+5 display rows. The signal pattern 500 can be repeated for the gate clock signal 402 and the source driver signal 404.

Figure 6:
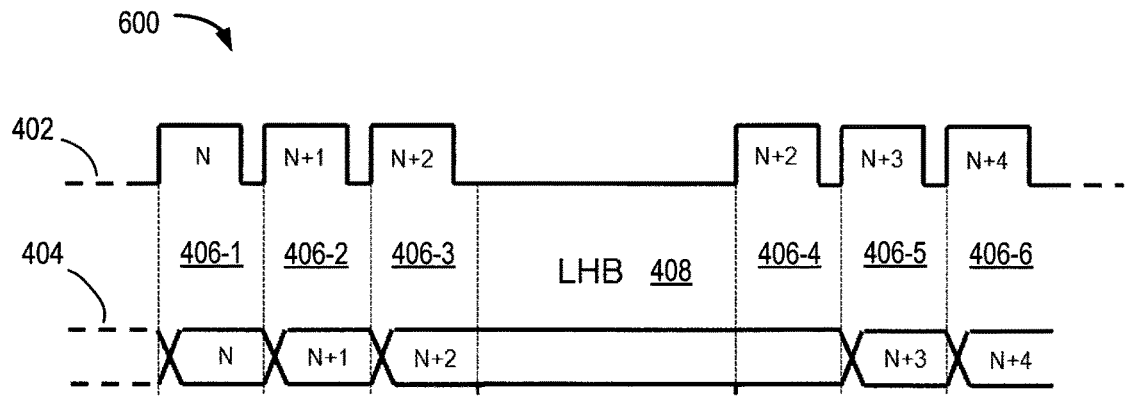

FIG. 6 shows a signal pattern 600. In the example, the three display update periods 406-1, 406-2, and 406-3 correspond to display rows (gate lines) N, N+1, and N+2. In each of the display update periods 406-1 through 406-3, the source driver signal 404 is switched to a desired source voltage for the Xth pixel on each of the respective N, N+1, and N+2 display rows. During a long H-blank period 408, the processing system 110 controls the source driver signal 404 to hold the source voltage of the last display update period, e.g., the source voltage during the display update period 406-3 for the Xth pixel in the display row N+2 (hold last source).

After the long H-blank period 408, the three display update periods 406-4, 406-5, and 406-6 correspond to display rows (gate lines) N+2, N+3, and N+4. That is, the display row N+2 is replayed during the display update period 406-4 ("replay last"). In the display update period 406-4, the source driver signal 404 already has the desired source voltage for the Xth pixel of the display row N+2. In each of the display update periods 406-5 through 406-6, the source driver signal 404 is switched to a desired source voltage for the Xth pixel on each of the respective N+3 and N+4 display rows. The signal pattern 600 is a combination of hold last source during the long H-blank 408, replay last row after long H-blank 408 ("hold last source, replay last row"). The signal pattern 600 can be repeated for the gate clock signal 402 and the source driver signal 504. Note that the signal pattern 600 requires one extra display update period per long H-blank period, since a display row is replayed after each long H-blank period.

Figure 7:
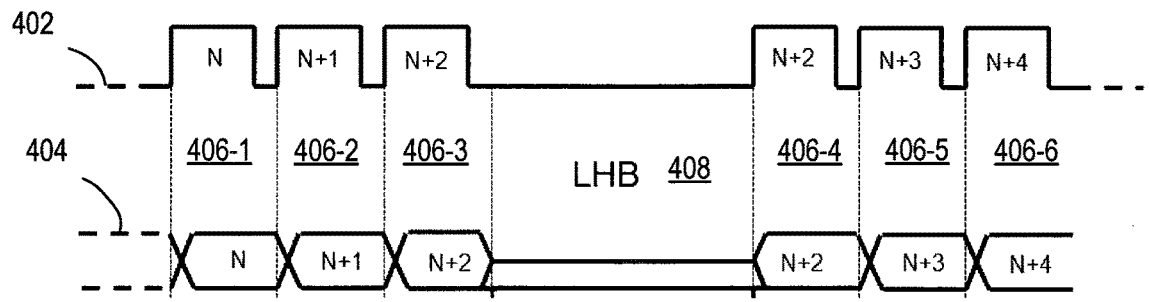

FIG. 7 shows a signal pattern 700. The signal pattern 700 is similar to the signal pattern 600, with the exception of the source voltage during the long H-blank period 408. Rather than controlling the source driver signal 404 to hold the source voltage of the last display update period, the processing system 110 controls the source driver signal 404 to switch the source voltage to a selected voltage (hold selected). In an embodiment, the selected voltage is Vcom. In another embodiment, the selected voltage is Vaa/2. In another embodiment, rather than controlling the source driver signal 404 to hold any specific voltage, the processing system 110 allows the source driver signal 404 to electrically float (high impedance). In the signal pattern 700, in the display update period 406-4, the processing system 110 controls the source driver signal 404 to switch to the desired source voltage for the Xth pixel of the display row N+2. The signal pattern 700 is a combination of hold selected or high impedance during the long H-blank 408, replay last row after long H-blank 408 ("hold selected/high impedance, replay last row"). Note that the pattern 700 requires one extra display update period per long H-blank period, since a display row is replayed after each long H-blank period.

Figure 8:
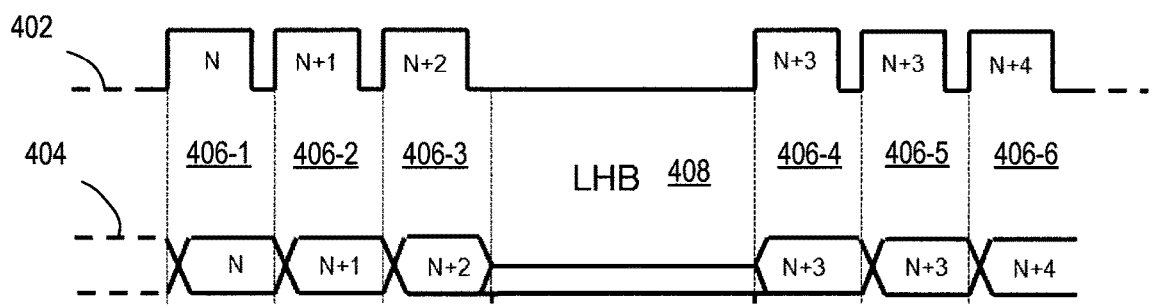

FIG. 8 shows a signal pattern 800. The signal pattern 800 is similar to the signal pattern 700, with the exception of the source voltage in display update periods 406-4 and 406-5. In the signal pattern 800, during the display update period 406-4, the processing system 110 controls the source driver signal 404 to switch to the desired source voltage for the Xth pixel of the display row N+3 ("replay next row"). During the display update period 406-5, the processing system 110 holds the source voltage and replays the display row N+3. During the display update period 406-6, the processing system 110 switches the source voltage to the desired source voltage for the Xth pixel of the display row N+4. The signal pattern 800 is a combination of hold selected or high impedance during the long H-blank 408, replay next row after long H-blank 408 ("hold selected/high impedance, replay next row"). Note that the pattern 800 requires one extra display update period per long H-blank period, since a display row is replayed after each long H-blank period.

Figure 9:
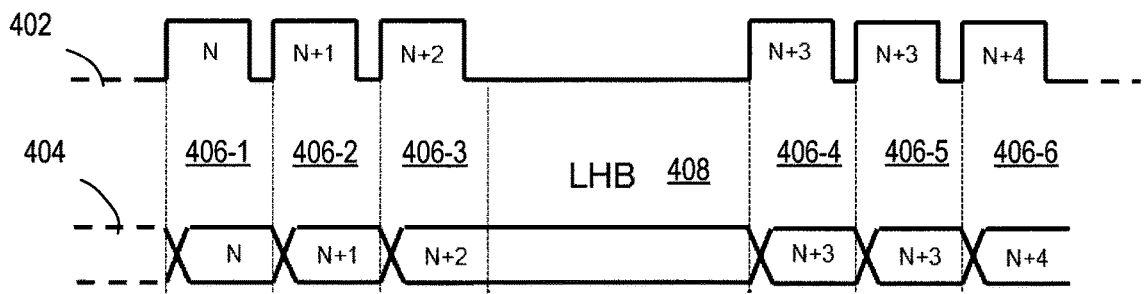

FIG. 9 shows a signal pattern 900. In the example, the three display update periods 406-1, 406-2, and 406-3 correspond to display rows (gate lines) N, N+1, and N+2. In each of the display update periods 406-1 through 406-3, the source driver signal 404 is switched to a desired source voltage for the Xth pixel on each of the respective N, N+1, and N+2 display rows. During the long H-blank period 408, the processing system 110 controls the source driver signal 404 to hold the source voltage of the last display update period, e.g., the source voltage during the display update period 406-3 for the Xth pixel in the display row N+2 (hold last source).

After the long H-blank period 408, the three display update periods 406-4, 406-5, and 406-6 correspond to display rows (gate lines) N+3, N+3, and N+4. In the display update period 406-4, the processing system 110 controls the source driver signal 404 to switch to the desired source voltage for the Xth pixel of the display row N+3. During the display update period 406-5, the processing system 110 holds the source voltage and replays the display row N+3 (reply next row). During the display update period 406-6, the processing system 110 switches the source voltage to the desired source voltage for the Xth pixel of the display row N+4. The signal pattern 900 is a combination of hold last source during the long H-blank 408, replay next row after long H-blank 408 ("hold last source, replay next row"). Note that the pattern 900 requires one extra display update period per long H-blank period, since a display row is replayed after each long H-blank period.

Figure 10:
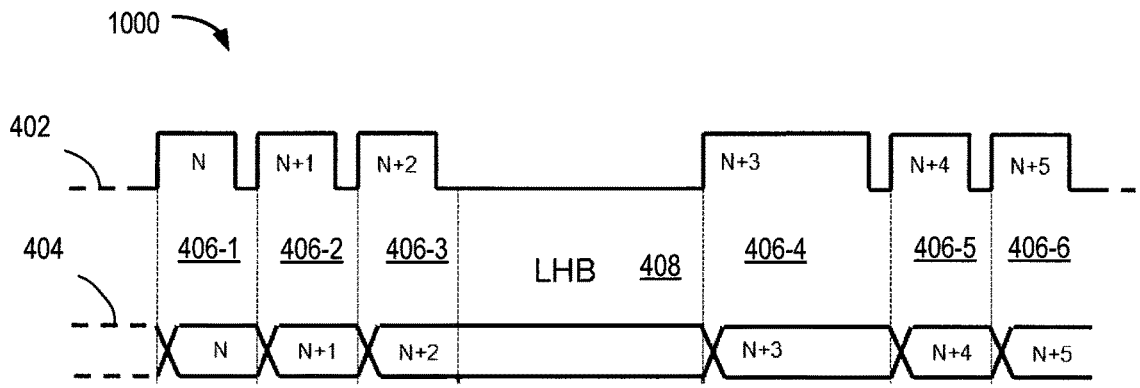

FIG. 10 shows a signal pattern 1000. In the example, the three display update periods 406-1, 406-2, and 406-3 correspond to display rows (gate lines) N, N+1, and N+2. In each of the display update periods 406-1 through 406-3, the source driver signal 404 is switched to a desired source voltage for the Xth pixel on each of the respective N, N+1, and N+2 display rows. During a long H-blank period 408, the processing system 110 controls the source driver signal 404 to hold the source voltage of the last display update period, e.g., the source voltage during the display update period 406-3 for the Xth pixel in the display row N+2 (hold last source).

After the long H-blank period 408, the three display update periods 406-4, 406-5, and 406-6 correspond to display rows (gate lines) N+3, N+4, and N+5. However, the display update period 406-4 is extended, e.g., twice the length of the other display update periods or other lengths longer or shorter than twice the length of the other display update periods. During the display update period 406-4 as extended, the processing system 110 controls the source driver signal 404 to switch to the desired source voltage for the Xth pixel of the display row N+3 ("extend next row"). In each of the display update periods 406-5 through 406-6, the source driver signal 404 is switched to a desired source voltage for the Xth pixel on each of the respective N+4 and N+5 display rows. The signal pattern 1000 is a combination of hold last source during the long H-blank 408, extend next row after long H-blank 408 ("hold last source, extend next row"). Note that the pattern 1000 requires an extension of at least a portion of a display update period per long H-blank period, since the display update period 406-4 is extended after each long H-blank period.

Figure 11:
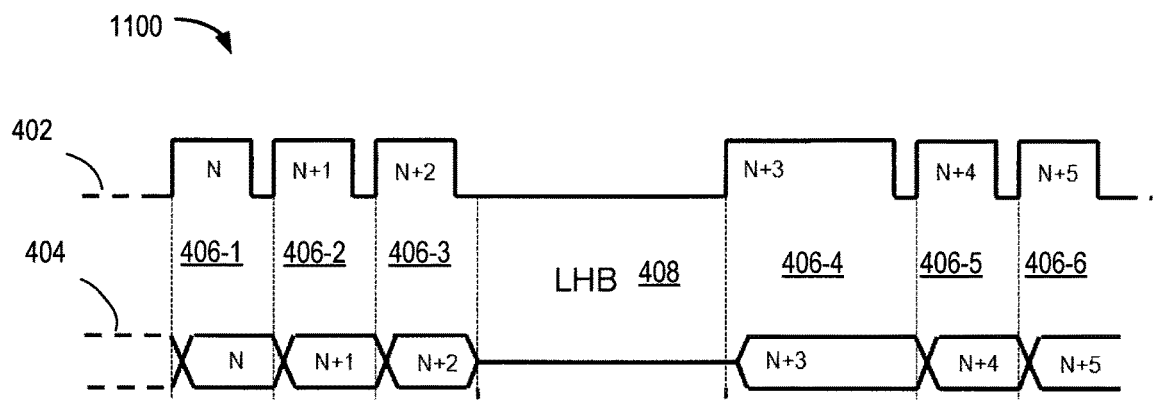

FIG. 11 shows a signal pattern 1100. The signal pattern 1100 is similar to the signal pattern 1000, with the exception of the source voltage during the long H-blank period 408. Rather than controlling the source driver signal 404 to hold the source voltage of the last display update period, the processing system 110 controls the source driver signal 404 to switch the source voltage to a selected voltage (hold selected). In an embodiment, the selected voltage is Vcom. In another embodiment, the selected voltage is Vaa/2. In another embodiment, the selected voltage is another voltage other than Vcom or Vaa/2. In another embodiment, rather than controlling the source driver signal 404 to hold any specific voltage, the processing system 110 allows the source driver signal 404 to electrically float (high impedance). In the signal pattern 1100, after the long H-blank period 408, the processing system 110 controls the source driver signal 404 to switch to the desired voltage for the Xth pixel of the display row N+3 and proceeds as described above in the signal pattern 1000 (extend next). The signal pattern 1100 is a combination of hold selected/high impedance during the long H-blank 408, extend next row after long H-blank 408 ("hold selected/high impedance, extend next row"). Note that the pattern 1100 requires an extension of at least a portion of a display update period per long H-blank period, since the display update period 406-4 is extended after each long H-blank period.

Figure 12:
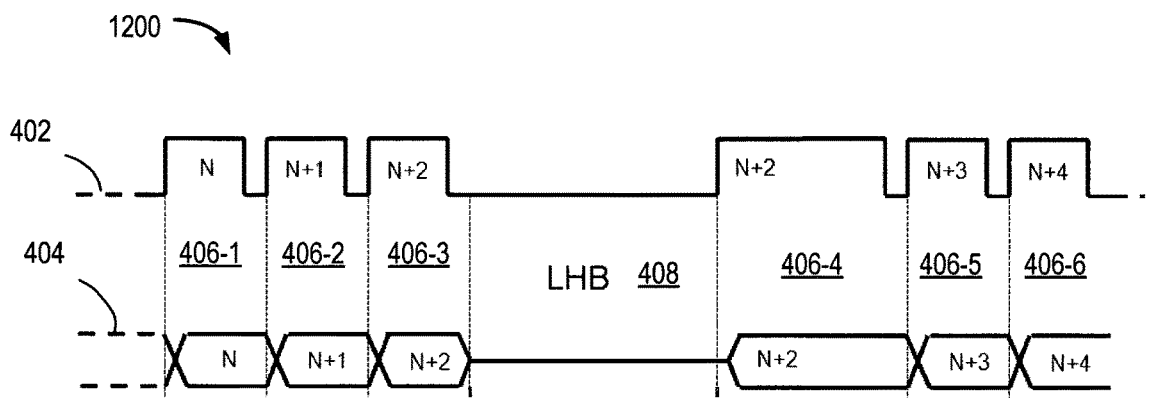

FIG. 12 shows a signal pattern 1200. The signal pattern 1200 is similar to the signal pattern 1100, with the exception of the source voltage in display update periods 406-4, 406-5, and 406-6. In the signal pattern 1200, during the display update period 406-4, the processing system 110 controls the source driver signal 404 to switch to the desired source voltage for the Xth pixel of the display row N+2 (replay last). That is, the display row N+2 is replayed. During the display update period 406-5, the processing system 110 controls the source driver signal 404 to switch to the desired source voltage for the Xth pixel of the display row N+3. During the display update period 406-6, the processing system 110 switches the source voltage to the desired source voltage for the Xth pixel of the display row N+4. The signal pattern 1200 is a combination of hold selected/high impedance during the long H-blank 408, extend and replay last row after long H-blank 408 ("hold selected/high impedance, extend and replay last row"). Note that the pattern 1200 requires at least one extra display update period per long H-blank period, since a display row is replayed after each long H-blank period and the next display update period after the long H-blank period is extended.

The processing system 110 can employ any of the signal patterns 400-1200 to control display updating and capacitive sensing in an integrated display device and capacitive sensing device. The signal patterns 400-1200 or any variation thereof can be used to mitigate display artifacts, such as dimming artifacts, through holding last source, holding next source, replaying last row, replaying next row, holding selected, holding high impedance, and extending next row, or some combination thereof. In some embodiments, no additional time is required to mitigate display artifacts. In other examples, some additional time is required to replay a given display line and/or extend a display update period after a long H-blank period. The signal patterns 400-1200 or variations thereof can be used with a capacitive sensing device having any pattern of sensing elements, such as the electrode patterns 250A and 250B. The signal patterns 400-1200 or variations thereof can be used while any type of capacitive sensing is performed during the long H-blank periods, such as absolute sensing and transcapacitive sensing. The signal patterns 400-1200 or variations thereof can be used with other display artifact mitigation techniques, such as dithering the display lines between which the long H-blank periods occur, lengthening gate enable latch times after long H-blank periods, lengthening the gradual output enable of the gate latch times, or the like.

Figure 13:
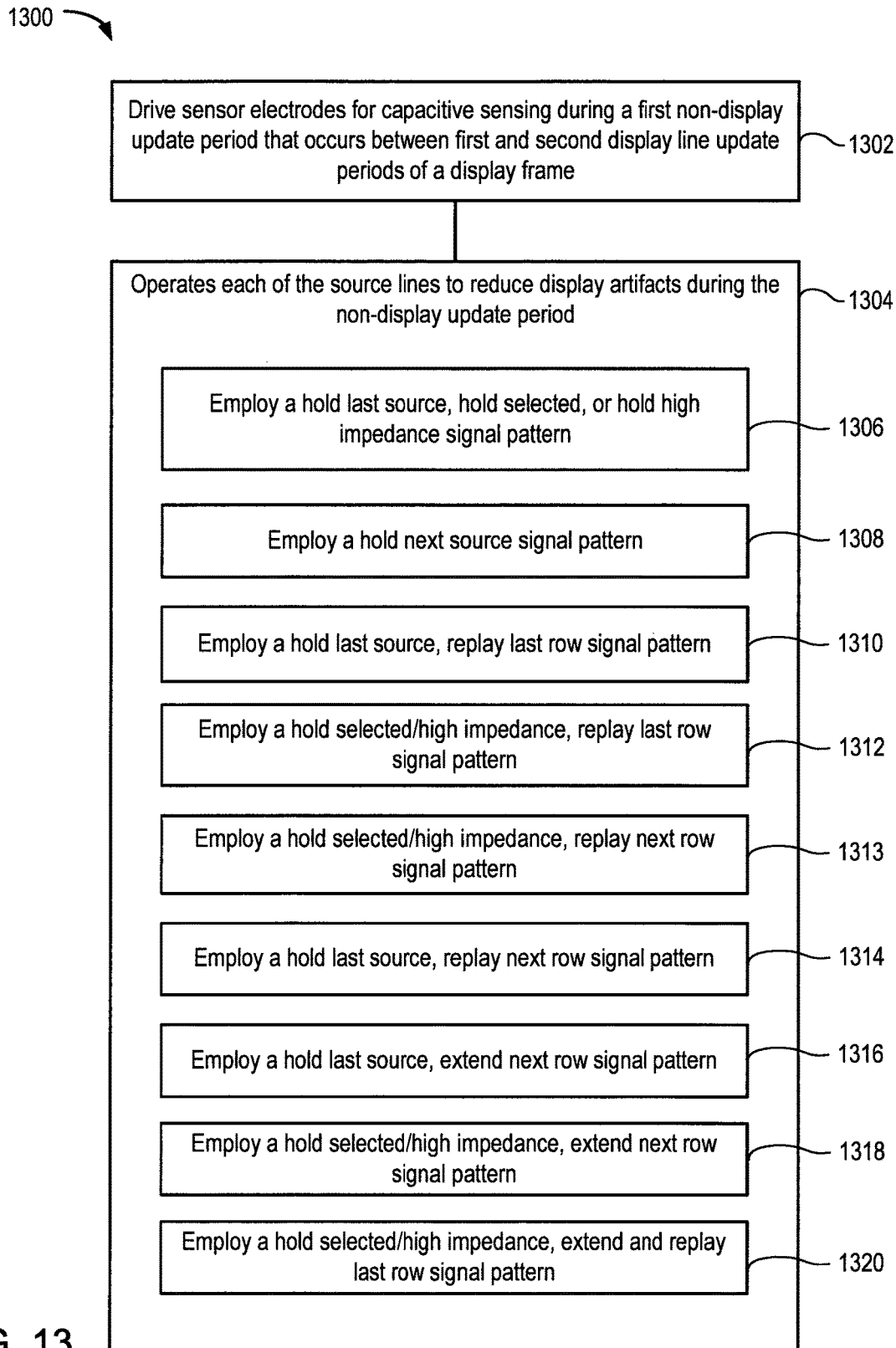
FIG. 13 is a flow diagram depicting a method of operating an integrated display device and capacitive sensing device according to an embodiment.

FIG. 13 is a flow diagram depicting a method 1300 of operating an integrated display device and capacitive sensing device according to an embodiment. The method 1300 can be performed by the processing system 110 described above. The method 1300 begins at operation 1302, where the processing system 110 drives sensor electrodes for capacitive sensing during a first non-display update period that occurs between first and second display line update periods of a display frame. The non-display update period is at least as long as one of the first and second display line update periods. For example, the processing system can drive sensor electrodes for capacitive sensing during the long H-blank period 408 described above for the example signal patterns 400-1200.

At operation 1304, the processing system 110 operates each of the source lines to reduce display artifacts during the non-display update period. In embodiments, the operation 1304 can include one or more of the following operations. At operation 1306, the processing system 110 can employ a hold last source, hold selected, or hold high impedance signal pattern (e.g., the pattern 400 or variation thereof). At operation 1308, the processing system 110 can employ a hold next source signal pattern (e.g., the signal pattern 500). At operation 1310, the processing system 110 can employ a hold last source, replay last row signal pattern (e.g., the signal pattern 600).

At operation 1312, the processing system 110 can employ a hold selected/high impedance, replay last row signal pattern (e.g., the signal pattern 700). At operation 1313, the processing system 110 can employ a hold selected/high impedance, replay next row signal pattern (e.g., the signal pattern 800).

At operation 1314, the processing system 110 can employ a hold last source, replay next row signal pattern (e.g., the signal pattern 900). At operation 1316, the processing system 110 can employ a hold last source, extend next row signal pattern (e.g., the signal pattern 1000). At operation 1318, the processing system 110 can employ a hold selected/high impedance, extend next row signal pattern (e.g., the signal pattern 1100). At operation 1320, the processing system 110 can employ a hold selected/high impedance, extend and replay last row signal pattern (e.g., the signal pattern 1200).

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for an integrated display device and capacitive sensing device, comprising:
    driver circuitry configured for coupling to a plurality of source lines and a plurality of sensor electrodes, each of the plurality of sensor electrodes comprising at least one common electrode configured for display updating and capacitive sensing; and
    a driver module coupled to the driver circuitry and configured to:
        drive the plurality of sensor electrodes for capacitive sensing during a first non-display update period that occurs between first and second display line update periods of a display frame, and during a second non-display update period that occurs between the second and a third display line update periods of the display frame, where each of the first and the second non-display update periods is at least as long as one of the first, second, and third display line update periods;
        hold a first source line of the plurality of source lines at a first source voltage during a full length of the first non-display update period;
        hold a second source line of the plurality of source lines at a second source voltage during the full length of the first non-display update period;
        hold the first source line at a third source voltage during a full length of the second non-display update period; and
        hold the second source line at a fourth source voltage during the full length of the second non-display update period, wherein each of the first source voltage, the second source voltage, the third source voltage and the fourth source voltage are different.

2. The processing system of claim 1, wherein the capacitive sensing comprises absolute capacitive sensing.

3. The processing system of claim 1, wherein the capacitive sensing comprises transcapacitive sensing.

4. The processing system of claim 1, wherein the first source voltage corresponds to the second display line update period and the third source voltage corresponds to the third display line update period.

5. The processing system of claim 1, wherein:
    a first gate line of a plurality of gate lines is selected during the first display line update period;
    the first source voltage and the second source voltage correspond to the first display line update period; and
    the first gate line is re-selected in the second display line update period.

6. The processing system of claim 1, wherein the driver module is configured to operate each of the plurality of source lines to reduce display artifacts during the first non-display update period by either driving the plurality of source lines with a constant voltage or electrically floating the plurality of source lines.

7. The processing system of claim 6, wherein:
    a first gate line of a plurality of gate lines is selected during the first display line update period; and
    the driver module is configured to operate each of the plurality of source lines to reduce display artifacts during the first non-display update period by re-selecting the first gate line in the second display line update period.

8. The processing system of claim 7, wherein the duration of the second display line update period is longer than the first display line update period.

9. The processing system of claim 6, wherein:
    a first gate line of a plurality of gate lines is selected during the first display line update period and a second gate line of the plurality of gate lines is selected during the second display line update period; and
    the driver module is configured to operate each of the plurality of source lines to reduce display artifacts during the first non-display update period by re-selecting the second gate line in a third display line update period after the second display line update period.

10. The processing system of claim 6, wherein the duration of the second display line update period is longer than the first display line update period.

11. The processing system of claim 1, wherein:
    a first gate line of a plurality of gate lines is selected during the first display line update period and a second gate line of the plurality of gate lines is selected during the second display line update period;
    the first source voltage and the second source voltage correspond to the first display line update period; and
    the second gate line is re-selected in the third display line update period.

12. The processing system of claim 1, wherein:
    the first source voltage and the second source voltage correspond to the first display line update period; and
    wherein the duration of the second display line update period is longer than the first display line update period.

13. An integrated display device and capacitive sensing device, comprising:
    a plurality of source lines;
    a plurality of sensor electrodes, each of the plurality of sensor electrodes comprising at least one common electrode configured for display updating and capacitive sensing; and
    a processing system, coupled to the plurality of source lines and the plurality of sensor electrodes, the processing system configured to:
        drive the plurality of sensor electrodes for capacitive sensing during a first non-display update period that occurs between first and second display line update periods of a display frame, and during a second non-display update period that occurs between the second and third display line update periods of the display frame, where each of the first and the second non-display update periods is at least as long as one of the first, second, and third display line update periods;
hold a first source line of the plurality of source lines at a first source voltage during a full length of the first non-display update period;
hold a second source line of the plurality of source lines at a second source voltage during the full length of the first non-display update period;
hold the first source line at a third source voltage during a full length of the second non-display update period; and
hold the second source line at a fourth source voltage during the full length of the second non-display update period, wherein each of the first source voltage, the second source voltage, the third source voltage, and the fourth source voltage are different.

14. The device of claim 13, wherein the first source voltage corresponds to the second display line update period and the third source voltage corresponds to the third display line update period.

15. The device of claim 13, wherein:
a first gate line of a plurality of gate lines is selected during the first display line update period;
the first source voltage and the second source voltage correspond to the first display line update period; and
the first gate line is re-selected in the second display line update period.

16. The device of claim 13, wherein the processing system is configured to operate each of the plurality of source lines to reduce display artifacts during the first non-display update period by either driving the plurality of source lines with a constant voltage or electrically floating the plurality of source lines.

17. A method of operating an integrated display device and capacitive sensing device having a plurality of source lines and a plurality of sensor electrodes, the plurality of sensor electrodes disposed in a matrix array on a common electrode layer for display updating and capacitive sensing, the method comprising:
driving the plurality of sensor electrodes for absolute capacitive sensing during a first non-display update period that occurs between first and second display line update periods of a display frame, and during a second non-display update period that occurs between the second and a third display line update periods of the display frame, where each of the first and the second non-display update periods is at least as long as one of the first, second, and third display line update periods;
holding a first source line of the plurality of source lines at a first source voltage during a full length of the first non-display update period;
holding a second source line of the plurality of source lines at a second source voltage during the full length of the first non-display update period;
holding the first source line at a third source voltage during a full length of the second non-display update period; and
holding the second source line at a fourth source voltage during the full length of the second non-display update period, wherein each of the first source voltage, the second source voltage, the third source voltage, and the fourth source voltage are different.

18. The method of claim 17, wherein the first source voltage corresponds to the second display line update period and the third source voltage corresponds to the third display line update period.

19. The method of claim 17, wherein:
a first gate line of a plurality of gate lines is selected during the first display line update period;
the first source voltage and the second source voltage correspond to the first display line update; and
the first gate line is reselected in the second display line update period.

20. The method of claim 17, wherein the step of operating comprises either driving the plurality of source lines with a constant voltage or electrically floating the plurality of source lines.

21. An integrated display device and capacitive sensing device, comprising:
a plurality of source lines;
a matrix array of sensor electrodes disposed on a common electrode layer for display updating and capacitive sensing; and
a processing system, coupled to the plurality of source lines and the sensor electrodes, the processing system configured to:
drive the sensor electrodes for capacitive sensing during a first non-display update period that occurs between first and second display line update periods of a display frame, and during a second non-display update period that occurs between the second and a third display line update periods of the display frame, where each of the first and the second non-display update periods is at least as long as one of the first, second, and third display line update periods; and
hold a first source line of the plurality of source lines at a first source voltage during a full length of the first non-display update period;
hold a second source line of the plurality of source lines at a second source voltage during the full length of the first non-display update period;
hold the first source line at a third source voltage during a full length of the second non-display update period; and
hold the second source line at a fourth source voltage during the full length of the second non-display update period, wherein each of the first source voltage, the second source voltage, the third source voltage, and the fourth source voltage are different.

* * * * *